(12) United States Patent
Wu et al.

(10) Patent No.: US 11,193,845 B2
(45) Date of Patent: Dec. 7, 2021

(54) ULTRAHIGH SENSITIVE PRESSURE-SENSING FILM BASED ON SPIKY HOLLOW CARBON SPHERES AND THE FABRICATION METHOD THEREOF

(71) Applicant: Fudan University, Shanghai (CN)

(72) Inventors: Limin Wu, Shanghai (CN); Lan Shi, Shanghai (CN)

(*) Notice: Subject to any disclaimer, the term of this patent is extended or adjusted under 35 U.S.C. 154(b) by 66 days.

(21) Appl. No.: 16/619,463

(22) PCT Filed: Jul. 30, 2019

(86) PCT No.: PCT/CN2019/098277
§ 371 (c)(1),
(2) Date: Dec. 5, 2019

(87) PCT Pub. No.: WO2021/012297
PCT Pub. Date: Jan. 28, 2021

(65) Prior Publication Data
US 2021/0172817 A1    Jun. 10, 2021

(30) Foreign Application Priority Data
Jul. 25, 2019 (CN) .......................... 201910674945.4

(51) Int. Cl.
   G01L 9/04          (2006.01)
   C01B 32/15        (2017.01)
   (Continued)

(52) U.S. Cl.
   CPC ................ G01L 9/04 (2013.01); B29C 41/08 (2013.01); C01B 32/15 (2017.08); G01L 1/005 (2013.01);
   (Continued)

(58) Field of Classification Search
   CPC ........... G01L 9/04; G01L 1/005; C01B 32/15; C01B 32/00–32/198; C01B 32/152;
   (Continued)

(56) References Cited

U.S. PATENT DOCUMENTS
2017/0108358 A1    4/2017   Bastianini

FOREIGN PATENT DOCUMENTS
CN    102374910 A   *   3/2012
CN    102374910 A      3/2012
(Continued)

OTHER PUBLICATIONS

Kim, "Seeded swelling polymerized sea-urchin-like core-shell typed polystyrene/polyaniline particles and their electric stimuli-response," RSC Adv., 2015 5, 81546. (Year: 2015).*
(Continued)

*Primary Examiner* — Matthew D Matzek
(74) *Attorney, Agent, or Firm* — OPES IP Consulting Co. Ltd.

(57) ABSTRACT

The present invention relates to an ultrahigh sensitive pressure-sensing film based on spiky hollow carbon spheres and the fabrication method thereof. The fabricated spiky hollow carbon spheres composed polydimethylsiloxane sensing film whose spheres were well dispersed in the matrix. The spiky structure is useful for the spheres to trigger Fowler-Nordheim (F-N) tunneling effect and thus enhancing the sensitivity of the material. The carbon material fabricated by the precursor transformation method contains a proper Nitrogen doping, which has efficiently increased the carrier migration ability. The hollow structure can both regulate the density of fillers and help to improve its temperature independence. Calcine the spheres under an inert atmosphere to transform the spiky hollow organic spheres into a carbon one, in this process the Nitrogen fraction and graphitization (Continued)

can be adjusted. The above carbon spheres then can be assembled with polydimethylsiloxane to achieve the composite film. The material of the present invention exhibits ultrahigh sensitivity, high sensing density, transparent, low hysteresis, temperature noninterference, and its processing method is simple, maturity and environment friendly.

10 Claims, 7 Drawing Sheets

(51) Int. Cl.
  *B29C 41/08*  (2006.01)
  *G01L 1/00*  (2006.01)
  *B29K 83/00*  (2006.01)
  *B29K 105/16*  (2006.01)
  *B29K 507/04*  (2006.01)

(52) U.S. Cl.
  CPC .... *B29K 2083/00* (2013.01); *B29K 2105/162* (2013.01); *B29K 2507/04* (2013.01); *Y10T 428/25* (2015.01)

(58) Field of Classification Search
  CPC ................ Y10T 428/25; B82Y 30/00; C08K 3/04–3/045; B29C 41/08; B29K 2083/00; B29K 2105/162; B29K 2507/04

USPC ............... 428/221, 323, 357, 402, 403, 407; 977/734, 735, 737, 773, 775, 778, 779, 977/784, 785

See application file for complete search history.

(56) References Cited

FOREIGN PATENT DOCUMENTS

| | | |
|---|---|---|
| CN | 102759371 A | 10/2012 |
| CN | 103245370 A | 8/2013 |
| CN | 103536937 A | 1/2014 |
| CN | 106949850 A | 7/2017 |
| CN | 108225625 A | 6/2018 |
| CN | 108760101 A | 11/2018 |
| KR | KE 20110110388 A | 10/2011 |

OTHER PUBLICATIONS

Han, "Porous nitrogen-doped hollow carbon spheres derived from polyaniline for high performance supercapacitors," J. Mater. Chem. A, 2014, 2, 5352. (Year: 2014).*

* cited by examiner

ULTRAHIGH SENSITIVE PRESSURE-SENSING FILM BASED ON SPIKY HOLLOW CARBON SPHERES AND THE FABRICATION METHOD THEREOF

CROSS REFERENCE TO RELATED APPLICATION

The present application claims priority to CN Application Serial No. 201910674945.4, filed on Jul. 25, 2019, and PCT Application Serial No. PCT/CN2019/098277, filed on Jul. 30, 2019, which are hereby incorporated by reference in their entirety.

FIELD

The present invention relates to an ultrahigh sensitive pressure-sensing film based on spiky hollow carbon spheres and the fabrication method thereof, which belongs to the stretchable electronics.

BACKGROUND

The pressure-sensing material is the core unit of a pressure-sensing process. When under pressure, the deformation of the microstructure would change the total electrical property of the sensing material, by detecting the change of electrical signal will achieve a pressure-sensing function. The pressure sensor is widely used in the area of aerospace, aviation, navigation, petrochemical, power machinery, medical, meteorological, geological, etc. In industry, a pressure sensor could be used for the detection of the equipment's operational status. For example, patients' breath, the pressure of oil and gas pipelines, deformation of rails, whether there is something encountered into running equipment and the dynamic deformation of the engine inlet port.

Traditional pressure sensors are usually based on MEMS (Micro-Electro-Mechanical System), which shows good stability and a relatively high detection precise, while MEMS-based pressure sensors are limited in large scale applications and curved surfaces. But, stretchable pressure-sensing materials based on organic-inorganic composites would perform well in the two application areas mentioned above.

There are several ways to realize a stretchable pressure sensor, including piezoresistive, capacitive, piezoelectricity, triboelectricity, magnetic, optical fiber, etc. Among these piezoresistive and capacitive are most commonly used in stretchable pressure sensors for static force testing.

SUMMARY OF THE DISCLOSURE

Objectives: The primary objective of the present invention is to provide an ultrahigh sensitive pressure-sensing film and its fabrication process. This film can not only exhibit an ultrahigh sensitivity but also exhibits vertical-direction conduction and horizontal-direction insulation phenomenon under pressure, reaching a theoretical sensing density of 3,200,000 per cm2 according to calculations. The sensing film exhibits good environmental stabilities, it can be fabricated by an industrially viable and scalable spin-coating method, providing an efficient avenue for realizing large-scale production and application of ultrahigh sensitivity pressure sensors on various surfaces. Additionally, it can function well underwater, and performs resist temperature interference and fatigue resistance. Also, it processes advantages in mass production and compatibility with currently mature film coating processes such as spin coating, therefore has good theoretical research and practical application value.

The present invention provides an ultrahigh sensitive pressure-sensing film based on a spiky hollow carbon sphere, comprising conductive spiky hollow spheres and siloxane materials with dielectric properties, wherein the mass percentage of the conductive spiky hollow spheres relative to siloxane materials ranges in 0.5%-20%.

In the present invention, the fabricating thickness of the pressure-sensing film ranges in changed from 0.1 μm-200 μm.

In the present invention, the mass percentage of nitrogen relative to carbon in the spiky hollow carbon spheres range in 0.2%-15%; the mass percentage of oxygen relative to carbon in the spiky hollow carbon spheres ranges 2%-35%.

The present invention provides a fabrication method of ultrahigh sensitive pressure-sensing film based on spiky hollow carbon sphere, comprising the following steps:

(1) In 10-30° C., adding 0.1-1 g microspheres template and 0.1-0.5 g precursor into 10 ml deionized water, dispersing in ultrasonic for 8-18 min, sealing the above solution and stirring for 1-8 h, then adding the polymerization initiator corresponding to the precursor and stirring for 18-28 h; By centrifugation and freeze-drying, a kind of organic spiky hollow sphere was obtained;

(2) The spheres obtained from step (1) were then heated with 330-360° C. under an N2 atmosphere for 50-70 min and further heated to 600-950° C. for 1-2 h to obtain spiky hollow carbon spheres;

(3) Coating a sacrifice layer onto a substrate for later use;

(4) Mixing the spiky hollow carbon spheres obtained from step (2) and siloxane materials in an ice bath for 4.5-5.5 h with high speed, wherein the mass percentage of the spiky hollow carbon spheres relative to the siloxane materials ranges in 0.05%-5% (changed from 0.5%-20%), then a slurry for fabricating the pressure-sensing film was obtained;

(5) Coating the slurry from step (4) onto the substrate from step (3), then curing it in a 60-120° C. oven for 15-180 min, then immersing the substrate into the solution which could dissolve the sacrifice layer for 2 h, and the ultrahigh sensitive pressure-sensing film was obtained.

In the present invention, the precursor in step (1) comprises one or more of aniline, pyrrole, dopamine, melamine, and amino-acid.

In the present invention, the microspheres template in step (1) comprises one or more of nano polystyrene spheres, nano silicon dioxide spheres and nano polymethyl methacrylate spheres.

In the present invention, the diameter of the spiky hollow carbon spheres in step (2) ranges in 100-1000 nm.

In the present invention, the method of the coating in step (5) comprises one or more of spin coating, tape casting, spray coating, draw-off method, drip method, and molding.

In the present invention, the material of the sacrifice layer in step (3) comprises one or more of polyvinyl alcohol, polymethyl methacrylate, and dextran.

In the present invention, the siloxane material in step (4) is polydimethylsiloxane.

The benefits of the pressure sensing material prepared in the present invention are:

(1) Based on the proper design of the carbon sphere composition, it shows an excellent carrier transport ability. As the fixed point in the sensing system, this would enhance the reliability effectively.

(2) After some reasonable design, the sensing material has a specific mass fraction which makes it working under the F-N tunneling effect dominated conditions. An extremely tiny stress could trigger a signal change in a hyper-exponential way, thus achieve an ultrahigh sensitive sensing.

(3) The filler is the thin-walled carbon hollow sphere, so after combined with the polydimethylsiloxane, the hollow structure can effectively absorb the distribution change caused by the external temperature change. Thus, making the pressure-sensing material temperature noninterference.

(4) By introducing the ultra-thin film design, the rebound stroke can be greatly reduced, and the signal response rate and transparency can be increased.

(5) Benefited from the F-N tunneling effect and the statistical behavior of nano spheres, this sensing film exhibits a vertical-direction conduction and horizontal-direction insulation phenomenon under pressure, laying the foundation for ultrahigh sensing density array applications.

(6) As the synthetic process is simple, the raw material is cheap and the fabrication of the composite film is mature, providing an efficient avenue for realizing large-scale production.

(7) The spiky hollow carbon sphere/polydimethylsiloxane based ultrahigh sensitive pressure-sensing film fabricated from the present invention exhibits superior characteristics, including ultrahigh sensitivity, high array density, transparency, low hysteresis, temperature noninterference, capable in complex environment (such as submerged detection, large temperature range detection, complex surface, etc.), and its fabrication method is simple, maturity and environment friendly.

DETAILED DESCRIPTION

The present invention is further described in the following embodiments, and not only limited to these embodiments. Meanwhile, all the procedures are normal methods and all raw materials are from commercial access unless otherwise specified.

Embodiment 1

A total of 0.5 g polystyrene spheres with a diameter of 600 nm was dispersed into 10 ml deionized water. After ultrasonic treatment for 10 min under room temperature, 0.5 g aniline was added and stirred at 100 rpm for 3 hours. Then the above solution was added with 100 ml 0.5 M Fe(NO3)3 aqueous solution and accelerated the stir to 300 rpm for 24 h. The obtained spheres were washed with deionized water three times by centrifugal treatment with a speed of 5000 rpm and dried in a freeze dryer for 48 h.

Figure 1:
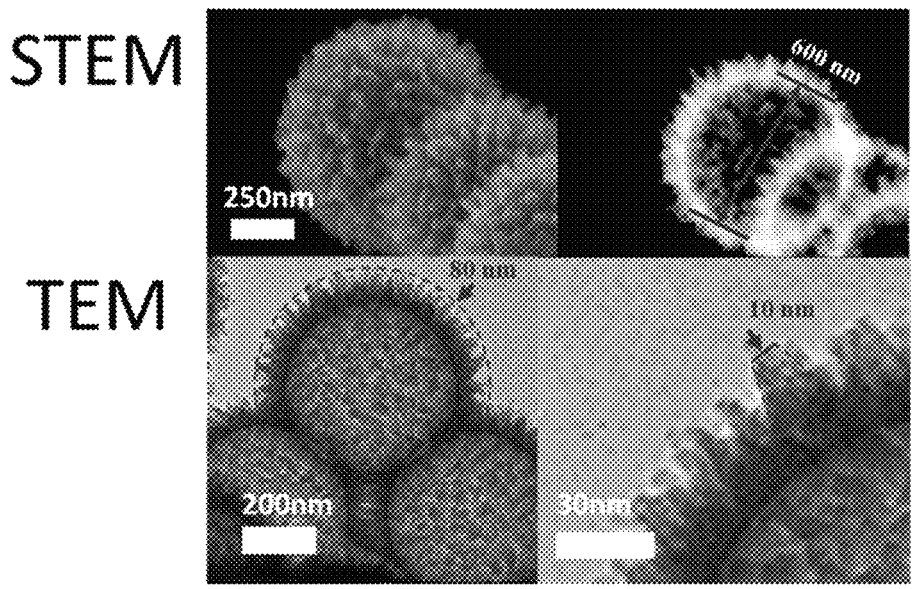
FIG. 1 shows the SEM and TEM images of the spiky conductive spheres with a diameter of 600 nm.

The powder obtained by drying process was then heated with 350° C. under an N2 atmosphere for 1 h and further heated to 900° C. for 1 h to obtain spiky hollow carbon spheres. FIG. 1 shows the SEM and TEM images of the spiky conductive spheres.

Figure 2:
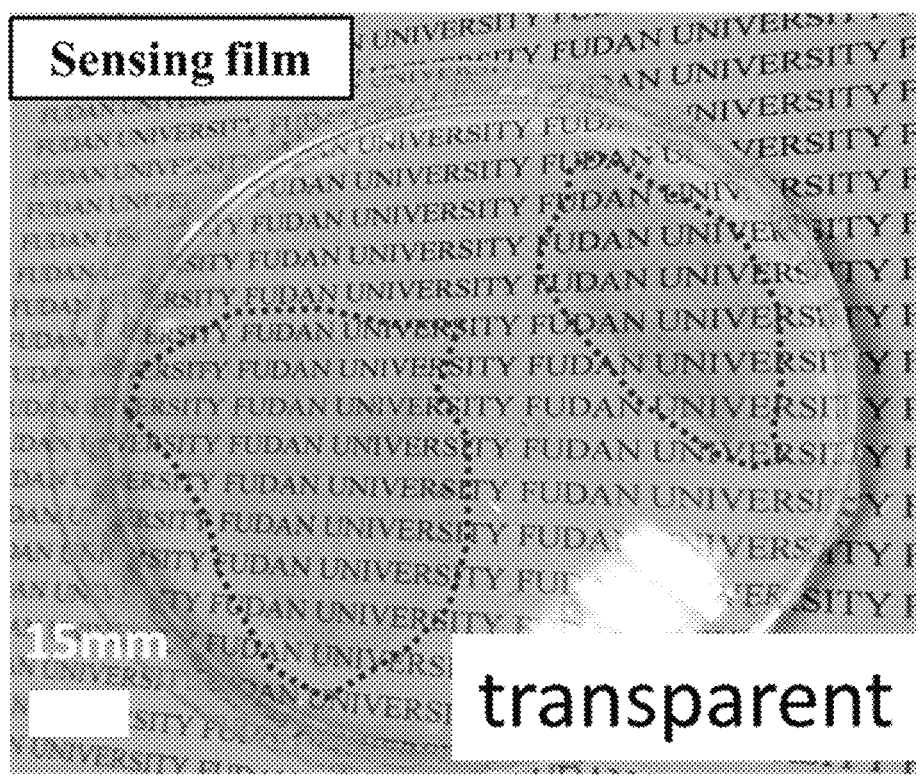
FIG. 2 is a photo of the peeled off thin film in a petri dish. Scale bar: 15 mm.

0.4 g of the obtained spiky hollow carbon spheres were dispersed in 10 ml PDMS (A:B=10:1, Sylgard™ 184, Dow-Corning) and stirred with 500 rpm in an ice bath for 5 h. The mixture was spin-coated onto a petri dish with a sacrifice layer of PVA. The spin coating program is 600 rpm for 9 s and then 5000 rpm for 35 s. After 3 h curing time under 80° C., 30 ml of deionized water was poured into the petri dish. Then after holding for 12 h at room temperature, the transparent ultrahigh sensitive sensing film was obtained, as shown in FIG. 2.

Figure 3:
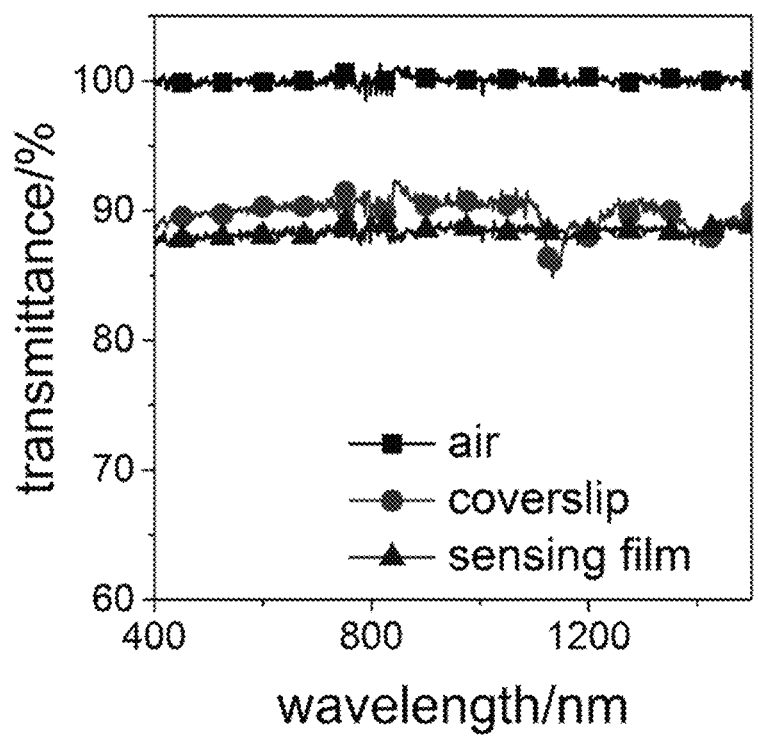
FIG. 3 shows the light transmittance spectrum.

FIG. 3 shows the ability of light transmittance from various wavelength, its transparency is close to a coverslip.

Figure 4:
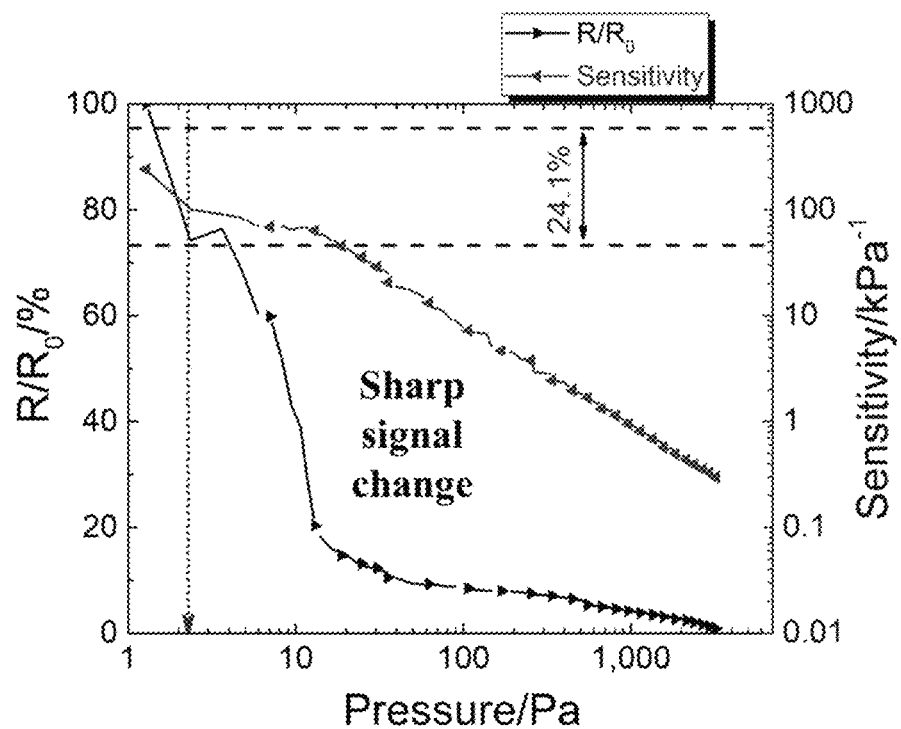
FIG. 4 shows the resistance response and pressure sensitivity of the pressure sensor.

FIG. 4 shows the resistance response and pressure sensitivity of the pressure sensor.

Figure 5:
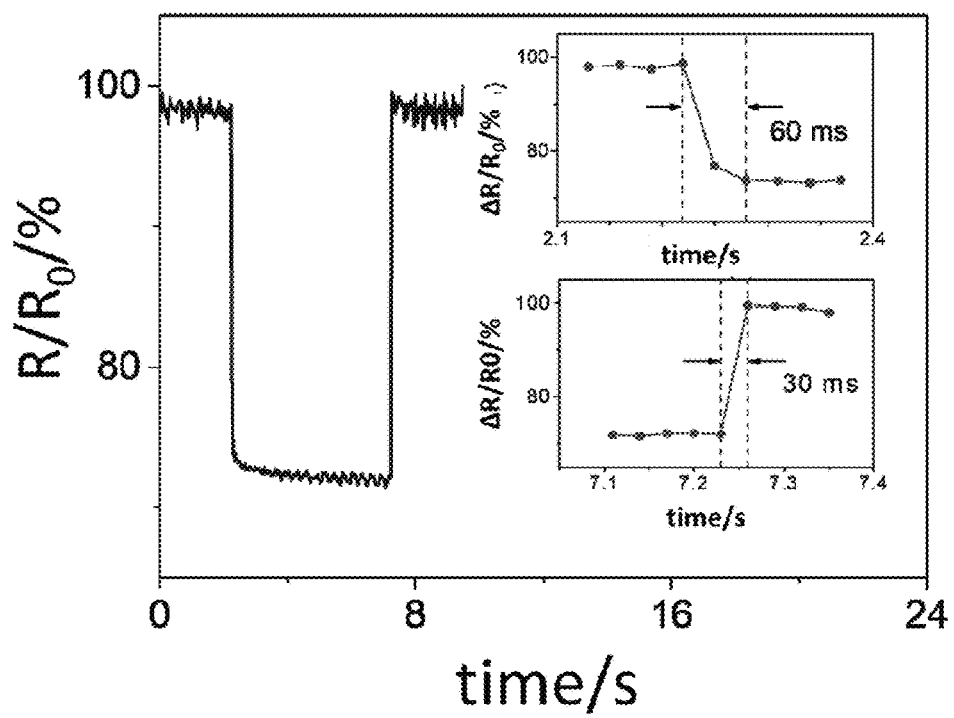
FIG. 5 shows the instant response of the pressure sensor.

FIG. 5 shows the instant response of the pressure sensor, which exhibits a response time of 60 ms for loading and 30 ms for unloading.

Figure 6:
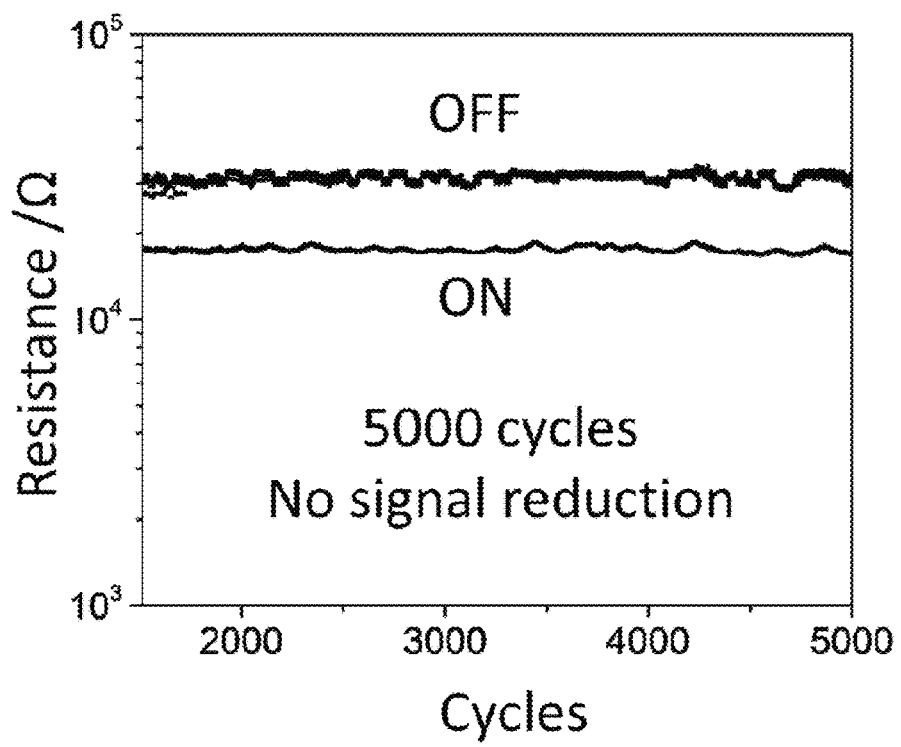
FIG. 6 shows the resistance of the sensor in the fatigue test.

FIG. 6 shows the resistance of the sensor at a pressure loading and unloading process in 5,000 cycles fatigue test.

Figure 7:
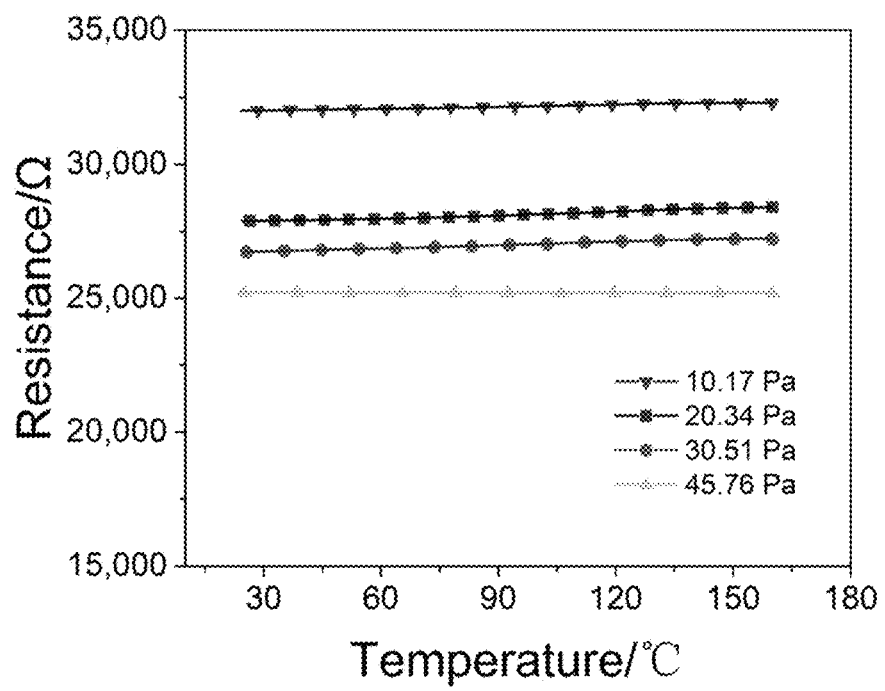
FIG. 7 shows the response of the sensor to different applied pressures from 25° C. to 160° C.

FIG. 7 shows the response of the sensor to different applied pressures from 25° C. to 160° C.

Figure 8:
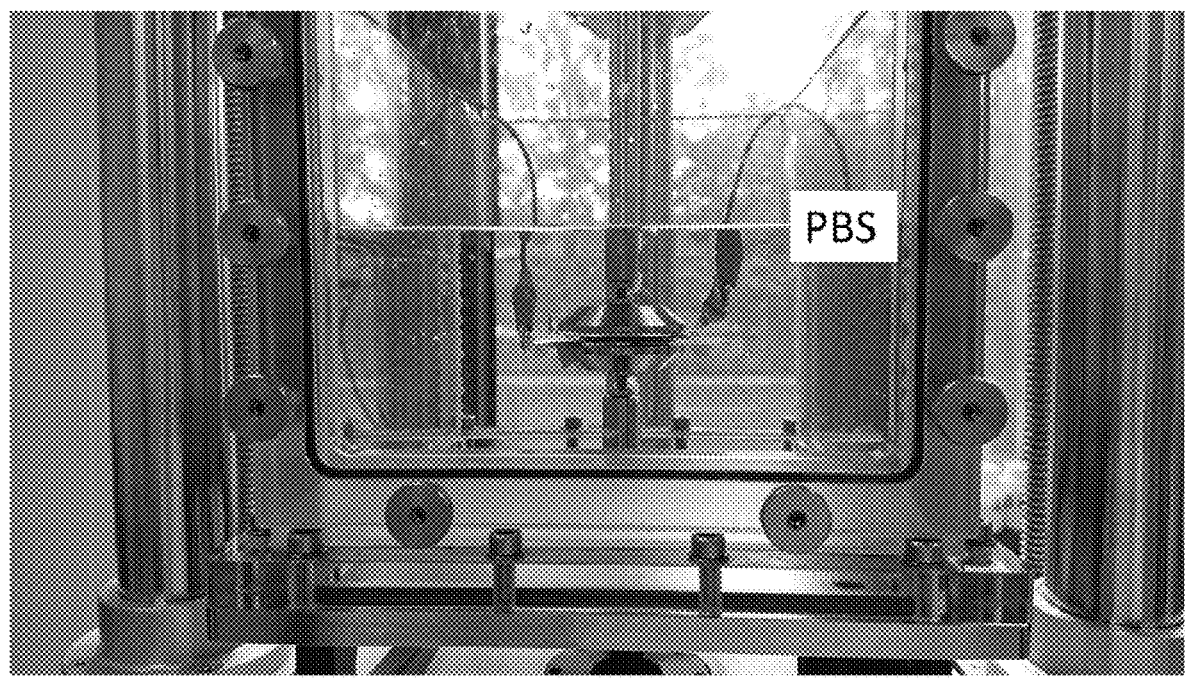
FIG. 8 shows the device for testing the resistance response in PBS solution, scale bar: 10 mm.

FIG. 8 shows the device for testing the resistance response in a 20 cm depth of PBS solution (which is used for simulating the human body fluid environment).

Figure 9:
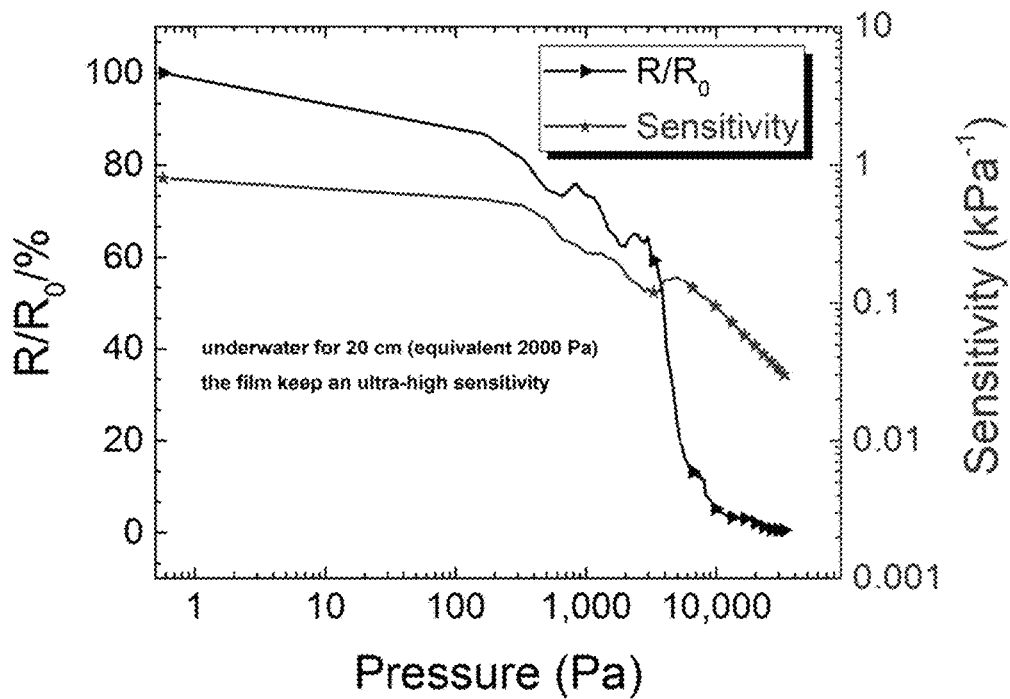
FIG. 9 shows the resistance response and pressure sensitivity of the pressure sensor in the PBS solution.

FIG. 9 shows the resistance response and pressure sensitivity of the pressure sensor in the PBS solution.

Figure 10:
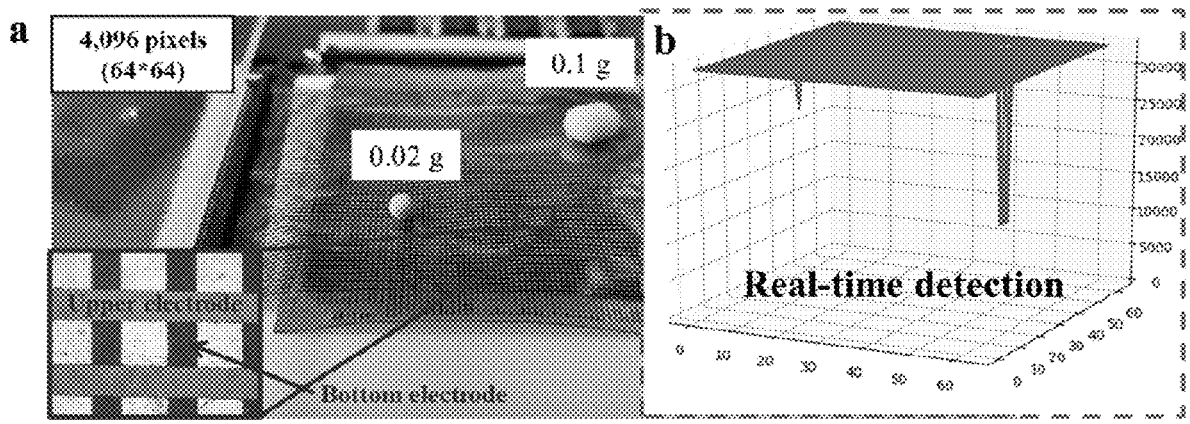
FIG. 10 shows detection by a 64×64 pixel pressure sensor, wherein (a) is the testing photo, (b) is the real-time result graph.

FIG. 10 shows the discriminate ability by detecting two very slight objects with a 64×64 pixel on 3.2 cm×3.2 cm pressure sensor array.

Figure 11:
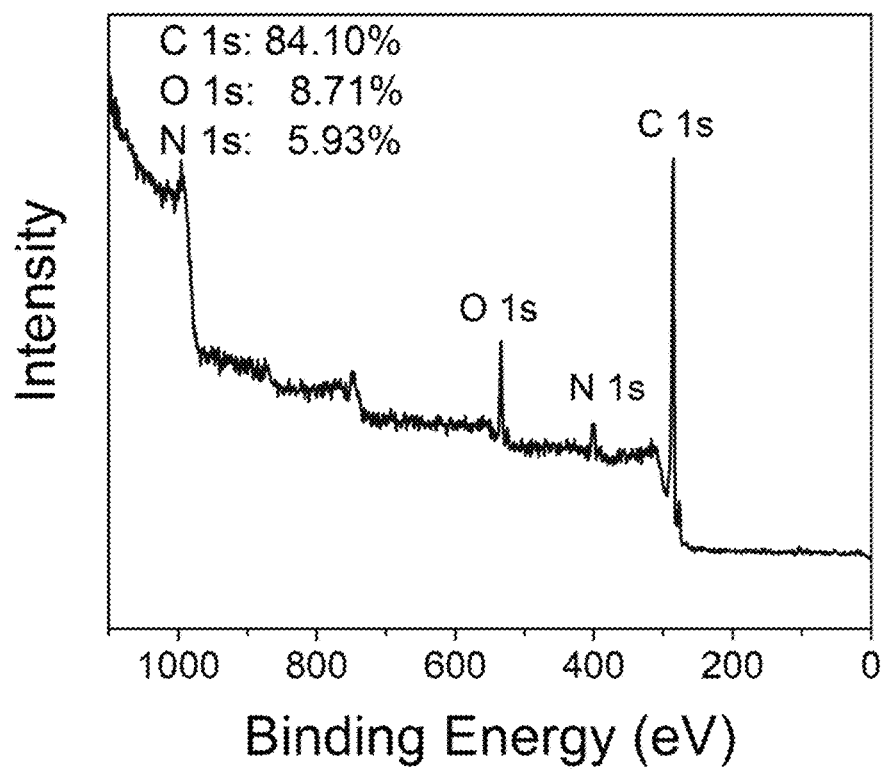
FIG. 11 shows the XPS survey spectrum of the samples in embodiment 1.

FIG. 11 shows the XPS survey spectrum of the samples in embodiment 1.

Embodiment 2

A total of 0.8 g polystyrene spheres with a diameter of 800 nm was dispersed into a 10 ml Trish buffer solution which PH is 8.5. After ultrasonic treatment for 10 min under room temperature. 0.3 g dopamine and 0.1 g ammonium persulfate were added in order and stirred at 200 rpm. After 12 hours, the obtained spheres were washed with deionized water and ethanol three times by centrifugal treatment with speed of 5000 rpm, respectively. Then dried in a freeze dryer for 48 h.

The spheres were then heated with 350° C. under an N2 atmosphere for 1 h and further heated to 800° C. for 1 h to obtain spiky hollow carbon spheres.

Then, 0.35 g of the obtained spiky hollow carbon spheres were dispersed in 10 ml PDMS (A:B=10:1, Sylgard™ 184, Dow-Corning) and stirred with 500 rpm in an ice bath for 5 h. The mixture was spin-coated onto a petri dish, which was coated with a sacrifice layer of PVA. The spin coating program is 600 rpm for 9 s and then 5000 rpm for 35 s. After 3 h curing time under 80° C., 30 ml of deionized water was poured into the petri dish. Then after holding for 12 h at room temperature, the transparent ultrahigh sensitive sensing film was obtained.

Figure 12:
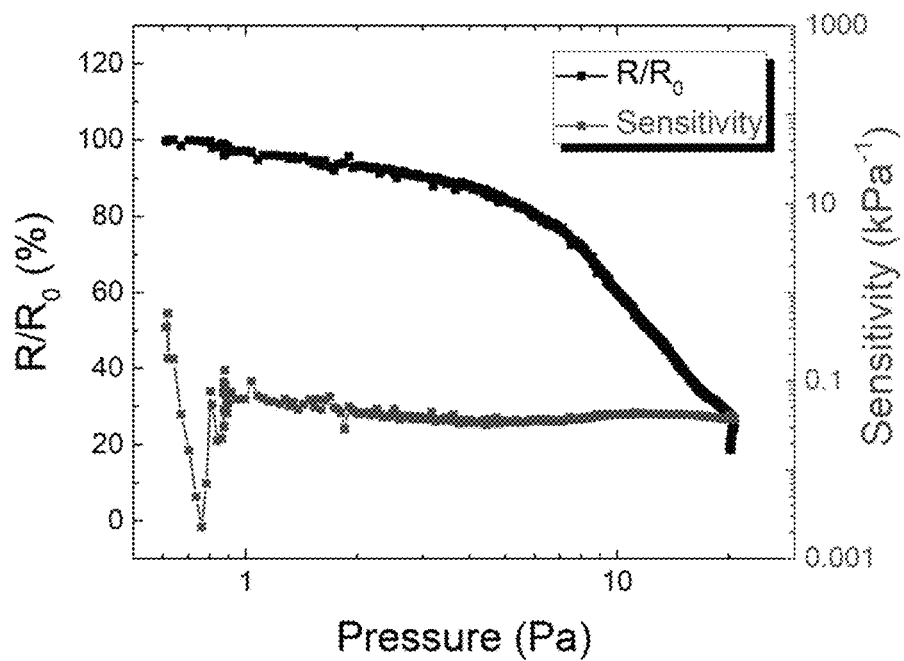
FIG. 12 shows the resistance response and pressure sensitivity of the sensor in embodiment 2.

FIG. 12 shows the resistance response and pressure sensitivity of the sensor in embodiment 2.

Figure 13:
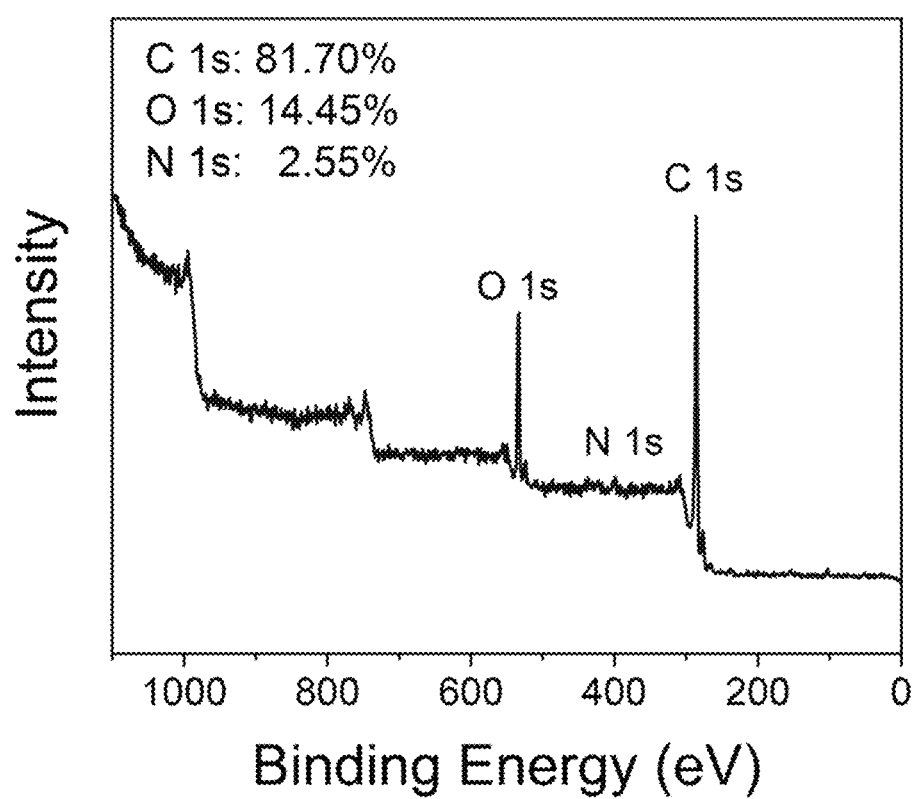
FIG. 13 shows the XPS survey spectrum of the samples in embodiment 2.

FIG. 13 shows the XPS survey spectrum of the samples in embodiment 2.

The invention claimed is:

1. An ultrahigh sensitive pressure-sensing film based on a spiky hollow carbon sphere, comprising conductive spiky hollow carbon spheres and siloxane materials with dielectric properties, wherein the mass percentage of the conductive spiky hollow carbon spheres relative to the siloxane materials ranges between 0.5%-20%.

2. The pressure-sensing film according to claim 1, having a fabricating thickness of 0.1 μm to 200 μm.

3. The pressure-sensing film according to claim 1, wherein the mass percentage of nitrogen relative to carbon in said spiky hollow carbon spheres ranges between 0.2%-15%; the mass percentage of oxygen relative to carbon in said spiky hollow carbon spheres ranges between 2%-35%.

4. A fabrication method of the ultrahigh sensitive pressure-sensing film based on spiky hollow carbon sphere according to claim 1, comprising the following steps:
  (1) At 10-30° C., adding 0.1-1 g of a microsphere template and 0.1-0.5 g of a precursor into 10 ml deionized water, dispersing by ultrasonication for 8-18 minutes to obtain a first solution, sealing the first solution and stirring for 1-8 hours, then adding to the first solution a polymerization initiator corresponding to the precursor and stirring for 18-28 hours, and by centrifugation and freeze-drying, a kind of organic spiky hollow spheres is obtained from the first solution;
  (2) Said spheres obtained from step (1) are then heated to 330-360° C. under an $N_2$ atmosphere for 50-70 minutes and further heated to 600-950° C. for 1-2 hours to obtain conductive spiky hollow carbon spheres;
  (3) Coating a sacrifice layer onto a substrate for later use;
  (4) Mixing said spiky hollow carbon spheres obtained from step (2) and siloxane materials with dielectric properties in an ice bath for 4.5-5.5 hours with high speed to obtain a slurry for fabricating the pressure-sensing film, wherein the mass percentage of said conductive spiky hollow carbon spheres relative to said siloxane materials ranges between 0.5%-20%;
  (5) Coating said slurry from step (4) onto said substrate from step (3), then curing it in a 60-120° C. oven for 15-180 minutes, and then immersing said substrate into a second solution for dissolving the sacrifice layer for 2 hours to obtain said ultrahigh sensitive pressure-sensing film.

5. The fabrication method of the ultrahigh sensitive pressure-sensing film according to claim 4, wherein said precursor in step (1) comprises one or more of aniline, pyrrole, dopamine, melamine, and amino-acid.

6. The fabrication method of the ultrahigh sensitive pressure-sensing film according to claim 4, wherein said microspheres template in step (1) comprises one or more of nano polystyrene spheres, nano silicon dioxide spheres and nano polymethyl methacrylate spheres.

7. The fabrication method of the ultrahigh sensitive pressure-sensing film according to claim 4, wherein the diameter of said spiky hollow carbon spheres in step (2) ranges between 100-1000 nm.

8. The fabrication method of the ultrahigh sensitive pressure-sensing film according to claim 4, wherein said coating in step (5) comprises one or more of spin coating, tape casting, spray coating, draw-off method, drip method, and molding.

9. The fabrication method of the ultrahigh sensitive pressure-sensing film according to claim 4, wherein the material of said sacrifice layer in step (3) comprises one or more of polyvinyl alcohol, polymethyl methacrylate, and dextran.

10. The fabrication method of the ultrahigh sensitive pressure-sensing film according to claim 4, wherein said siloxane material in step (4) is polydimethylsiloxane.

* * * * *